(12) United States Patent
Bunting et al.

(10) Patent No.: US 11,286,916 B2
(45) Date of Patent: *Mar. 29, 2022

(54) ASSEMBLY METHOD FOR A SHAPE MEMORY ALLOY ACTUATOR ARRANGEMENT

(71) Applicant: CAMBRIDGE MECHATRONICS LIMITED, Cambridge (GB)

(72) Inventors: Stephen Matthew Bunting, Cambridge (GB); James Howarth, Cambridge (GB); Andrew Benjamin David Brown, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,807

(22) Filed: May 4, 2020

(65) Prior Publication Data

US 2020/0263673 A1 Aug. 20, 2020

Related U.S. Application Data

(63) Continuation of application No. 15/576,568, filed as application No. PCT/GB2016/051527 on May 26, 2016, now Pat. No. 10,648,459.

(30) Foreign Application Priority Data

May 26, 2015 (GB) ..................... 1508968

(51) Int. Cl.
*F03G 7/06* (2006.01)
*G03B 3/10* (2021.01)
(Continued)

(52) U.S. Cl.
CPC ............... *F03G 7/065* (2013.01); *G02B 7/08* (2013.01); *G03B 3/10* (2013.01); *G02B 7/09* (2013.01);
(Continued)

(58) Field of Classification Search
CPC ... F03G 7/065; G03B 3/10; G03B 2205/0076; G02B 7/08; G02B 7/09; G02B 27/646; Y10T 29/49812
See application file for complete search history.

(56) References Cited

U.S. PATENT DOCUMENTS

| 4,721,471 A * | 1/1988 | Mueller | ............... H01R 25/003 |
| | | | 439/78 |
| 7,650,914 B2 * | 1/2010 | Bogursky | ............ H01R 43/048 |
| | | | 140/105 |

(Continued)

FOREIGN PATENT DOCUMENTS

| WO | WO 2007113478 | * 10/2007 | ............. F03G 7/065 |
| WO | WO 2008129291 | * 10/2008 | ............... F03G 7/06 |

(Continued)

*Primary Examiner* — Bayan Salone
(74) *Attorney, Agent, or Firm* — Haley Guiliano LLP

(57) ABSTRACT

An SMA actuator arrangement is assembled using a strut element shaped to comprise a sacrificial strut body and crimp tabs held apart by the sacrificial strut body. A SMA wire is laid across the crimp tabs which are folded and pressed to form crimps holding the SMA wire. The crimps are then attached to static and moving parts, after which the sacrificial strut body is removed. The method allows the crimping to be performed without hindrance from the static and moving parts, the sacrificial strut body holding the relative locations of the crimps prior to attachment.

19 Claims, 3 Drawing Sheets

(51) Int. Cl.
*G02B 7/08* (2021.01)
*G02B 7/09* (2021.01)
*G02B 27/64* (2006.01)

(52) U.S. Cl.
CPC .... *G02B 27/646* (2013.01); *G03B 2205/0076* (2013.01); *Y10T 29/49812* (2015.01)

(56) References Cited

U.S. PATENT DOCUMENTS

| | | | | |
|---|---|---|---|---|
| 7,974,025 | B2* | 7/2011 | Topliss | G03B 3/10 359/823 |
| 8,350,959 | B2* | 1/2013 | Topliss | G02B 7/08 348/374 |
| 8,588,598 | B2* | 11/2013 | Topliss | F03G 7/065 396/72 |
| 8,830,335 | B2* | 9/2014 | Topliss | G02B 27/646 348/208.11 |
| 9,479,699 | B2* | 10/2016 | Brown | F03G 7/065 |
| 2007/0294873 | A1* | 12/2007 | Bogursky | H01R 43/048 174/84 C |
| 2009/0295986 | A1* | 12/2009 | Topliss | G02B 7/023 348/374 |
| 2013/0002933 | A1* | 1/2013 | Topliss | G02B 7/08 348/345 |
| 2013/0300880 | A1* | 11/2013 | Brown | G03B 3/10 348/208.1 |
| 2015/0322929 | A1* | 11/2015 | Morikawa | G02B 7/09 348/335 |

FOREIGN PATENT DOCUMENTS

| | | | |
|---|---|---|---|
| WO | WO 2011104518 | 9/2011 | |
| WO | WO-2011104518 A1 * | 9/2011 | ............... G02B 7/08 |
| WO | WO 2013118601 * | 8/2013 | ............. F03G 7/065 |
| WO | WO 2013175197 | 11/2013 | |
| WO | WO-2013175197 A1 * | 11/2013 | ......... H04N 5/23287 |

* cited by examiner

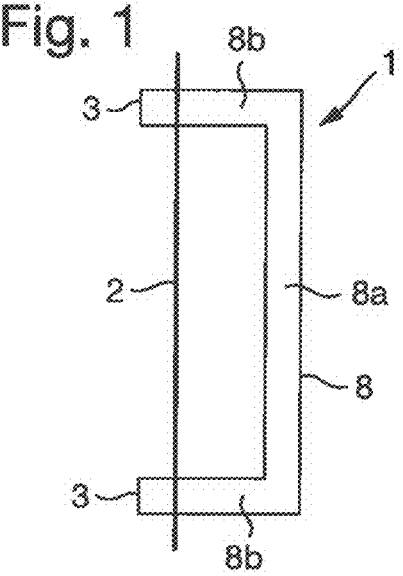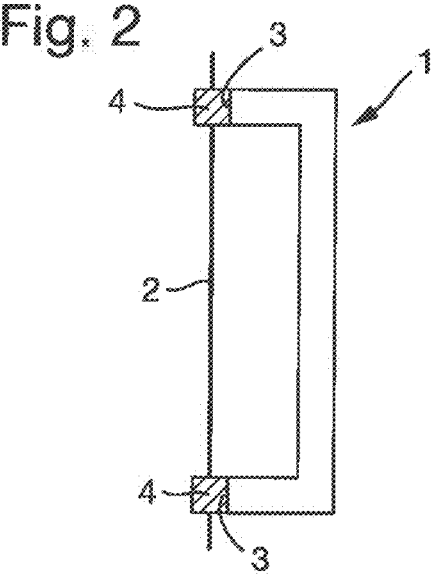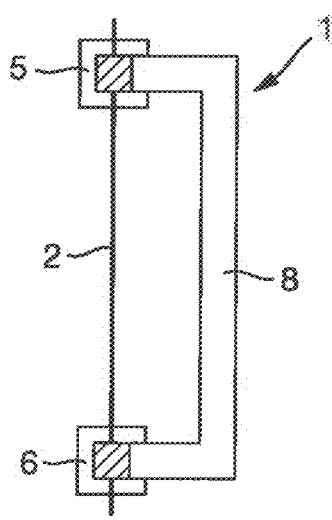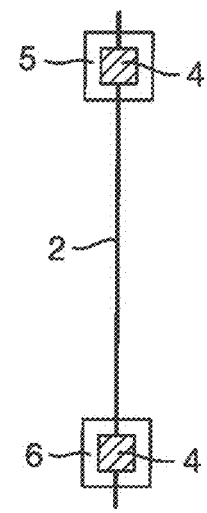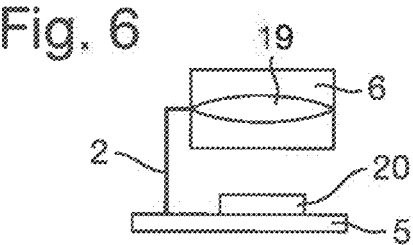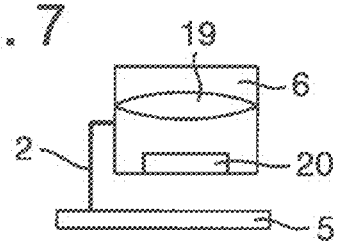

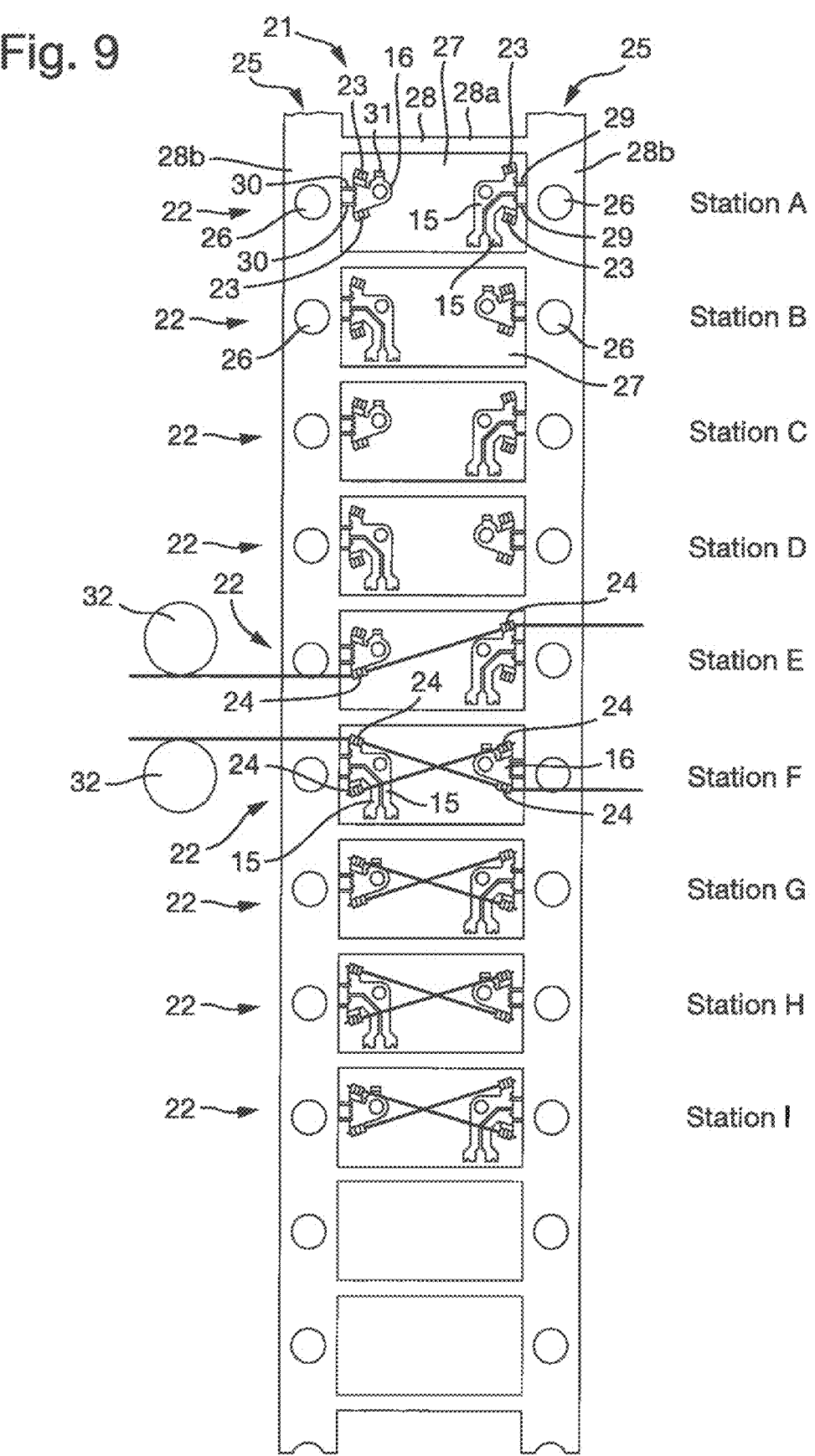

ASSEMBLY METHOD FOR A SHAPE MEMORY ALLOY ACTUATOR ARRANGEMENT

CROSS-REFERENCE TO RELATED APPLICATIONS

This application is a continuation of U.S. patent application Ser. No. 15/576,568, filed Nov. 22, 2017, now allowed, which is a national stage application under 35 U.S.C. § 371 of International Application PCT/GB2016/051527, filed May 26, 2016, which claims priority of GB Patent Application GB 1508968.3, filed May 26, 2015. The disclosures of which are hereby incorporated by reference herein in their entireties.

The present invention relates to assembly of a shape memory alloy (SMA) actuator arrangement.

SMA actuators are known for use in handheld electronic devices, such as cameras and mobile phones. Such actuators may be used for example in miniature cameras to effect focus, zoom or optical image stabilization (OIS). By way of example, WO-2007/113478 discloses an SMA actuator arrangement for a camera providing autofocus using a single SMA wire and WO-2013/175197 discloses a compact an SMA actuator arrangement for a camera providing OIS using four SMA wires. Further, WO-2011/104518 discloses an SMA actuator arrangement comprising eight SMA wires capable of effecting both autofocus and OIS. In each of these disclosures, each SMA wire is fixed at its ends to a stationary part and a moving part, and the preferred method of fixing is crimping in which a crimp tab is folded and pressed over the SMA wire to form a crimp holding the SMA wire.

However, the crimping process has high demands, especially in a miniature camera. When assembling SMA actuator arrangements, one of the key difficulties is ensuring that the length of the SMA wire is very tightly controlled compared to the distance between the point of attachment on the moving part and the point of attachment on the static part, which is a requirement for proper operation of the SMA wire. This requirement may be met by attaching the SMA wire to the static and moving parts in situ in the actuator arrangement. In that case, variations in the distance between the attachment points leads to a corresponding variation in the length of the SMA wire attached between these points thereby cancelling the error. However, if the SMA wire is attached in situ then space must be allowed in the design of the arrangement to allow the attachment process to occur. In the case where the wire is crimped onto a metal component, then space needs to be left for crimp tools to access both sides of the crimp tab. This is possible but restricts the design of the SMA actuator assembly, in particular making it more difficult to miniaturise the design.

According to the present invention, there is provided a method of assembling a shape memory alloy actuator arrangement comprising a static part and a moving part, and at least one shape memory alloy wire extending therebetween, the method comprising:

providing a strut element shaped to comprise a sacrificial strut body and crimp tabs held apart by the sacrificial strut body;

laying at least one shape memory alloy wire across the crimp tabs of the strut element;

folding and pressing the crimp tabs over the shape memory alloy wire to form crimps holding the shape memory alloy wire therebetween;

attaching the crimps to the static part and the moving part, respectively; and removing the sacrificial strut body, leaving the crimps attached to the static part and the moving part, respectively.

Thus, the SMA wire is crimped onto a strut element before attachment of the crimps to the moving and static parts. This allows the crimping to be performed without hindrance from the static and moving parts. However, any variations in the distance between the attachment points are accommodated in the same manner as when attaching directly to the static and moving parts. Thereafter, the sacrificial strut body of the strut element holds the relative locations of the crimps and maintains the length of the SMA wire therebetween, prior to the attachment to the moving and static parts. After attachment, the sacrificial strut structure is removed, leaving the crimps attached to the moving and static parts with an SMA wire of correct length.

Thus, the method allows the length of the SMA wire between the static and moving attachment points to be related to the distance between the attachment points themselves without requiring that the SMA wire attachment is performed on the static and moving parts. This provides a space saving in the design of the static and moving parts and hence a reduction in size of the SMA actuator arrangement, because space is not required for access of crimp tools to perform folding and pressing of the crimp tabs.

These benefits are particularly useful in an SMA actuator arrangement comprising plural SMA wires, for example 8 SMA wires.

These benefits are particular useful in an SMA actuator arrangement for a camera wherein the moving part is a camera lens assembly, for example for autofocus or OIS. In this type of device miniaturisation is important, particularly for use in a portable device such as a mobile telephone.

These benefits are increased where the plural SMA wires include SMA wires that cross.

In one type of embodiment, the strut element is shaped to further comprise two mount portions held apart by the sacrificial strut body, the crimp tabs being formed on the mount portions. In that case, the crimps may be attached to the static part and the moving part, respectively, by mounting the mount portions to the static part and the moving part, respectively. Thus, the crimps are indirectly attached to static and moving parts. This makes the attachment easier as the mount portion may be appropriately designed to facilitate the mounting, for example by being larger than the crimps or being appropriately shaped.

The method may be performed using a strut element that is shaped to comprise a series of attachment units each shaped to comprise a sacrificial strut body and crimp tabs held apart by the sacrificial strut body. In that case, the steps of folding and pressing the crimp tabs, attaching the crimps, and removing the sacrificial strut body may be performed in a continuous process in parallel on successive attachment units of the strut element. This provides a reduction in manufacturing time and cost.

To allow better understanding, an embodiment of the present invention will now be described by way of non-limitative example with reference to the accompanying drawings, in which:

FIGS. 1 and 2 are plan views of a strut element and an SMA wire in successive stages of a method of assembly;

FIG. 3 is a plan view of attachment points of a static and moving part;

FIGS. 4 and 5 are plan views of the attachment points of FIG. 3 and the strut element and SMA wire of FIGS. 1 and 2 in further, successive stages of a method of assembly;

FIGS. 6 and 7 are schematic side views of SMA actuator arrangements in a camera;

FIG. 9 is a plan view of a strut element comprising a series of attachment units.

Figure 8:
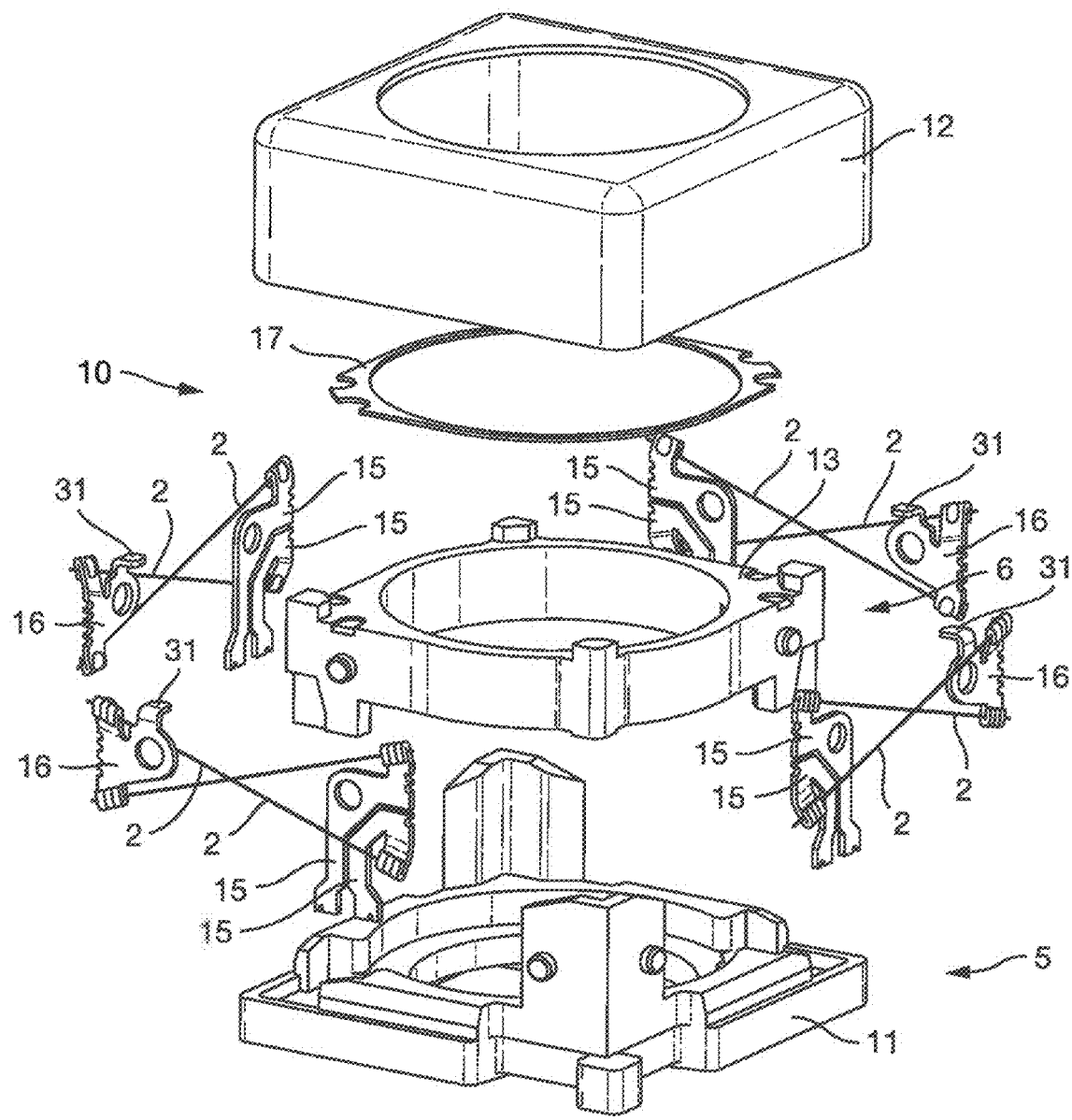
FIG. 8 is an exploded view of an SMA actuator arrangements in a camera.

A first method of assembling an SMA actuator arrangement is illustrated in FIGS. 1 to 5 and performed as follows.

In accordance with the first method, there is initially provided a fret 1 as shown in FIG. 1. The fret 1 is a type of strut element. The fret 1 may be made of metal, for example phosphor bronze, steel or laminate containing conductive components. The fret 1 may be a flat or a formed strip.

The fret 1 is shaped as follows. The fret 1 comprises a sacrificial strut body 8 having an elongate portion 8*a* and laterally protruding arms 8*b* at the extremes of the elongate portion 8*a*. The fret 1 further comprises crimp tabs 3 at the ends of the sacrificial strut body 8, i.e. at the ends of the arms 8*b*. The crimp tabs 3 may be formed into crimps as described below. Thus, the crimp tabs 3 are held apart by the sacrificial strut body 8.

Next, the method comprises laying an SMA wire 2 onto the fret 1 in a predetermined position near the ends 3 of the fret 1 across the crimp tabs 3, as shown in FIG. 1. The SMA wire 2 may be made of any suitable SMA material, for example Nitinol or another Titanium-alloy SMA material.

Next, the method comprises folding the crimp tabs 3 over the SMA wire 2 and pressing them to form crimps 4 that hold the SMA wire 2 therebetween, as shown in FIG. 2. The folding and pressing may be performed by a crimp tool (not shown). The pressing is performed by the application of pressure and firmly traps the SMA wire 2 in the crimps 4.

This step may performed away from a static part 5 and a moving part 6 of an SMA actuator arrangement described below, and thus without any hindrance. Any variations in the distance between the attachment points in the crimps 4 are accommodated by variation in the length of the SMA wire 2 left between the crimps 4. The sacrificial strut body 8 of the fret 1 holds the crimps 4 and maintains the length of the SMA wire 2 prior to the attachment described below.

FIG. 3 shows the static part 5 and the moving part 6 of the SMA actuator arrangement. The static part 5 and the moving part 6 are illustrated schematically in FIG. 3 as small blocks, but in practice they may be significantly larger components. The moving part 6 is movable relative to the static part 5, references to "static" and "moving" being references to that relative motion. The SMA wire 2 acts as an actuator to drive such movement in the assembled SMA actuator arrangement. In some types of SMA actuator arrangement, a suspension system may suspend the moving part 6 on the static part 5. In other types of SMA actuator arrangement, the SMA wires 2 may suspend the moving part 6 on the static part 5.

The static part 5 and the moving part 6 each comprise a fixing means 7. The fixing means 7 may be for example adhesive or a mechanical locating feature.

Next, the method comprises attaching the crimps 4 to the static part 5 and the moving part 6, respectively, as shown in FIG. 4. In this first method, the attachment is made by laying the crimps 4 onto the fixing means 7 and fixing the crimps 4 themselves to the static part 5 and the moving part 6 by the fixing means 7, for example by setting of adhesive or mechanical fixing. Thus, one of the crimps 4 forms the static wire attachment point and the other crimp 4 forms the moving wire attachment point.

The fixing means 7 allows some latitude in the placing of the fret 1, such that the distance between the crimps 4 and the length of the SMA wire 2 remain the same as set by the configuration of the fret 2. Thus, the length of the SMA wire 2 between the attachment points on the static part 5 and the moving part 6 is related to the distance between those attachment points without the SMA wire attachment being performed on the static part 5 and the moving part 6.

Next, the method comprises removing the sacrificial strut body 8, as shown in FIG. 5. The sacrificial strut body 8 may be removed by, for example, mechanical or laser cutting. This leaves the crimps 4 attached to the static part 5 and the moving part 6, respectively. However, the length of the SMA wire 2 remains that correctly set by the separation between the crimps 4 in the fret 1.

The static part 5 and moving part 6, with the SMA wire 2 assembled to extend therebetween, together form an SMA actuator arrangement. However, as the SMA wire 2 was crimped away from the static part 5 and the moving part 6, the design of the static part 5 and the moving part 6 does not need to allow access to the crimping tool. This allows for a more compact design.

The first method may be generalised as a method of assembling an actuator comprising a static part and a moving part with an SMA wire extending therebetween, wherein the end portions of the SMA wire are laid across the ends of a shaped fret comprising a body and two ends, the ends of the fret are folded over and pressed to form a crimp holding the SMA wire, one crimp is attached to the moving part of the actuator and the other crimp is attached to the static part of the actuator, and the body of the fret is removed.

FIGS. 1 to 5 are illustrative only and other shapes and configurations of components may be used. The fret 1 may be replaced by a strut element of any other shape appropriate for the assembled SMA actuator arrangement. For example, the method may be applied to a strut element that attaches plural SMA wires. In that case, the SMA wires may include wires which cross. In possible examples, there may be four SMA wires, or eight SMA wires.

In the above-described method the crimps 4 themselves are mounted to the static part 5 and the moving part 6, but that is not essential. In one alternative, a strut element may further comprise mount portions held apart by the sacrificial strut body, wherein the crimp tabs 3 are formed on the mount portions. In that case, the crimps 4 may be indirectly attached to the static part 5 and the moving part 6 by mounting the mount portions to the static part 5 and the moving part 6.

The methods described herein may be applied to an SMA actuator arrangement of any type, but may be applied in particular to an SMA actuator arrangement for a camera wherein the moving part is a camera lens assembly. In that case, the static part may include a casing.

By way of example, FIGS. 6 and 7 schematically show two different SMA actuator arrangements in a camera wherein the moving part 6 is a camera lens assembly comprising at least one lens 19 and the camera also includes an image sensor 20 onto which the at least one lens 19 focuses an image for image capture. In the example of FIG. 6, the image sensor 20 is mounted on the fixed part 5. In that case, the SMA actuator arrangement may provide autofocus by the SMA wire 2 driving relative movement of the moving part 6 along the optical axis to change the focus, and/or the SMA actuator arrangement may provide OIS by the SMA wire 2 driving relative movement of the moving part 6 orthogonal to the optical axis. In the example of FIG. 7, the image sensor 20 is mounted on the moving part 6. In that case, the SMA actuator arrangement provides OIS by the SMA wire 2 driving tilting of the moving part 6.

By way of further example, the methods described herein may be applied to an SMA actuator arrangement for a camera providing autofocus of the type disclosed in WO-2007/113478, an SMA actuator arrangement for a camera providing OIS of the type disclosed in WO-2013/175197, or an SMA actuator arrangement for a camera providing both multiple functions of the type disclosed in WO-2011/104518.

There will now be described a second method of assembling an SMA actuator arrangement 10 comprising several SMA wires 2 which may be used in a camera for providing multiple functions. Elements that are common with the first method are given the same reference numerals and for brevity a description thereof is not repeated.

FIG. 8 illustrates the SMA actuator arrangement 10 which is assembled by the second method and which is arranged as follows.

The SMA actuator arrangement 10 includes a static part 5 that comprises a base 11 that is an integrated chassis and sensor bracket for mounting an image sensor, and a screening can 12 attached to the base 11.

The SMA actuator arrangement 10 includes a moving part 6 that is a camera lens assembly comprising a lens carriage 13 carrying at least one lens (not shown in FIG. 8).

The SMA actuator arrangement 10 includes eight SMA wires 2 each attached between the static part 5 and the moving part 6. A pair of SMA wires 2 that cross each other are provided on each of four sides of the SMA actuator arrangement 10 as viewed along an optical axis. The SMA wires 2 have an overall configuration of the type illustrated in FIG. 4 of WO-2011/104518. As described in WO-2011/104518, which is incorporated herein by reference and to which reference is made, the SMA wires 2 are attached to the static part 5 and the moving part 6 in such a configuration that they are capable of providing relative movement of the moving part 5 with multiple degrees of freedom for providing both autofocus and OIS.

Thus, in respect of each pair of SMA wires 2, the SMA wires 2 are attached at one end to two static mount portions 15 which are themselves mounted to the static part 5 for attaching the SMA wires 2 to the static part 5. The static mount portions 15 are adjacent one another but are separated to allow them to be at different electrical potentials.

Similarly, in respect of each pair of SMA wires 2, the SMA wires 2 are attached at one end to a moving mount portion 16 which is itself mounted to the moving part 6 for attaching the SMA wires 2 to the moving part 6. The moving part 6 further comprises a conductive ring 17 connected to each of the moving mount portions 16 for electrically connecting the SMA wires 2 together at the moving part 6.

In accordance with the second method, there is initially provided a strut element 21 as shown in FIG. 9. The strut element 21 may be made of metal, for example phosphor bronze, steel or laminate containing conductive components. The strut element 21 is in the form of a flat strip. The strut element 21 is shaped as follows.

The strut element 21 comprises a series of attachment units 22. Each attachment unit 22 comprises a sacrificial strut body 28 having an elongate portion 28a and a laterally protruding base portions 28b at the extremes of the elongate portion 28a. The base portions 28b of each attachment unit 22 are sections of continuous strips 25 having apertures 26 to facilitate mechanical location and handling. Along the strut element 21, the elongate portions 28a of the sacrificial strut body 28 are separated to provide windows 27 therebetween.

Each attachment unit 22 also comprises two static mount portions 15 and a moving mount portion 16 which are positioned in respective window 27. The two static mount portions 15 are connected to one of the base portions 28b by connector tabs 29, and the moving mount portion 16 is connected to the other of the base portions 8b by connector tabs 30.

Each attachment unit 22 further comprises crimp tabs 23 formed on the static mount portions 15 and the moving mount portion 16. The crimp tabs 23 may be formed into crimps 24 as described below. Thus, the static mount portions 15 and the moving mount portion 16, and also the crimp tabs 23 formed thereon, are held apart by the sacrificial strut body 28.

The second method comprises steps equivalent to those of the first method, as described above, but performed in a continuous process with different steps being performed in parallel on different attachment units 22 in the strut element 21. In particular, stations A to H are aligned with successive attachment units 22 in the series and different steps of the second method are performed on the attachment units 22 in parallel at the stations A to H. Then the strut element 21 is stepped to move the successive attachment units 22 to the next station for performance of the next step. Thus, the second method is performed on an individual attachment unit 22 of the strut element 21, as the strut element 21 as a whole steps through the stations A to H.

Prior to processing at station A, the entire strut element 21 is cut from sheet material, preferably by stamping, although other processes such as etching or laser cutting may be used. The pre-formed strut element 21 is then supplied, preferably on a reel, to station A of the process where the first attachment unit 22 is processed, and then the strut element is stepped so that the first attachment unit steps to station B, and so on. The reel of pre-cut material unwinds as the strut element 21 steps through the process.

In particular, the following steps are performed at the stations A to H.

At station A, an attachment unit 22 is coined to smooth the sharp edges on the crimp tabs 23. At station B, the crimp tabs 23 are folded to be 90° from the plane of the strut element 21 (which is in the form of a flat strip).

At station C, the crimp tabs 23 are folded further, to be 150° from the plane of the strut element 21.

At station D, an electrical connection tab 31, for providing electrical connection to the conductive ring 17, is folded 90° from the plane of the strut element 21.

At station E, one of the SMA wires 2 is laid onto the strut element 1 across the crimp tabs 23, and then the crimp tabs 23 are folded over the SMA wire 2 and pressed to form crimp tabs 24 that hold the SMA wire 2 therebetween.

At station F, the other of the SMA wires 2 is laid onto the strut element 1 across the crimp tabs 23, and then the crimp tabs 23 are folded over the SMA wire 2 and pressed to form crimp tabs 24 that hold the SMA wire 2 therebetween.

The SMA wires 2 are introduced into stations E and F from reels 32 at a predetermined and controlled tension.

The folding and pressing at stations E and F may be performed by a crimp tool (not shown). The pressing is performed by the application of pressure and firmly traps the SMA wire 2 in the crimps 24.

At station G, the crimps 24 of one of the SMA wires 2 are bent by 5° to separate the two SMA wires 2.

At station H, the static mount portions 15 and the moving mount portion 16 are mounted to the static part 5 and the moving part 6, respectively. The mounting may be made by fixing the static mount portions 15 and the moving mount portion 16 by a fixing means, for example adhesive or a mechanical locating feature on the static part 5 and moving part 6. As a result, the crimp portions 24 are indirectly attached to the static part 5 and the moving part 6 by the mounting of the static mount portions 15 and the moving mount portion 16 to the static part 5 and the moving part 6.

The part-assembled SMA actuator arrangement 10 is offered to station H on a table that is rotated by 90° as the strut element 21 is stepped for attachment of a pair of SMA wires 2 to each side of the SMA actuator arrangement 10.

At station I, sacrificial strut body 28 is removed by cutting the connector tabs 29 and the connector tabs 30, for example, mechanical or laser cutting. This leaves the static mount portions 15 and the moving mount portion 16, and the crimps 24 formed thereon, attached to the static part 5 and the moving part 6, respectively.

The second method provides similar advantages to the first method, as described above, arising because the step of crimping the SMA wires 2 to the strut element are performed at stations E and F separately and before the step of attaching the SMA wires 2 to the static part 5 and moving part 6 at station H. However, the second method is performed as a continuous process reducing manufacturing time and cost.

The invention claimed is:

1. A method of assembling a shape memory alloy actuator arrangement comprising a static part, a moving part, and at least one shape memory alloy wire, the method comprising:
   providing a strut having a sacrificial strut body and crimp tabs held apart by the sacrificial strut body;
   laying at least one shape memory alloy wire across the crimp tabs of the strut;
   folding and pressing the crimp tabs over the shape memory alloy wire to form crimps holding the shape memory alloy wire therebetween;
   attaching the crimps to at least one of the static part and the moving part; and
   removing the sacrificial strut body, leaving the crimps attached to the at least one of the static part and the moving part.

2. The method according to claim 1, wherein the strut is a shaped fret and the crimp tabs are at the ends of the sacrificial strut body.

3. The method according to claim 1, wherein the crimps are attached to the at least one of the static part and the moving part by adhesive.

4. The method according to claim 1, wherein the crimps are attached to the at least one of the static part and the moving part by a mechanical locating feature.

5. The method according to claim 1, wherein the shape memory alloy actuator arrangement is a shape memory alloy actuator arrangement for a camera wherein the moving part comprises a camera lens assembly.

6. The method according to claim 1, wherein the at least one shape memory alloy wire comprises plural shape memory alloy wires.

7. The method according to claim 6, wherein the plural shape memory alloy wires include shape memory alloy wires that cross.

8. The method according to claim 1, wherein the sacrificial strut body is removed by mechanical or laser cutting.

9. The method according to claim 1, wherein
   the strut includes two mounts held apart by the sacrificial strut body, the crimp tabs being formed on the mounts, and
   said step of attaching the crimps includes mounting the mounts to the at least one of the static part and the moving part.

10. The method according to claim 1, wherein
    the strut includes a series of attachments, each attachment having the sacrificial strut body and crimp tabs held apart by the sacrificial strut body, and
    said steps of folding and pressing the crimp tabs, attaching the crimps, and removing the sacrificial strut body are performed in parallel on successive attachments of the strut.

11. The method according to claim 10, further comprising cutting the attachments from a continuous strip in parallel with performing said steps of folding and pressing the crimp tabs, attaching the crimps, and removing the sacrificial strut body.

12. The method according to claim 1, wherein said step of laying includes laying at least one shape memory alloy wire across two crimp tabs.

13. A strut comprising:
    a sacrificial strut body; and
    first and second crimps held apart by the sacrificial strut body, the first and second crimps holding at least one shape memory alloy wire by being folded and pressed over the at least one shape memory alloy wire, the sacrificial strut body being configured to hold the first and second crimps apart while the first and second crimps are attached to at least one of static and moving parts of an SMA actuator arrangement, the sacrificial strut body being removable from the first and second crimps to leave the at least one SMA wire extending between the attached first and second crimps.

14. The strut according to claim 13, wherein the at least one shape memory alloy wire comprises plural shape memory alloy wires.

15. The strut according to claim 14, wherein the plural shape memory alloy wires include shape memory alloy wires that cross.

16. The strut according to claim 13, further comprising two mounts held apart by the sacrificial strut body, the crimp tabs being formed on the mounts.

17. The strut according to claim 13, further comprising a series of attachments, each attachment being shaped to include the sacrificial strut body and the first and second crimps held apart by the sacrificial strut body.

18. The strut according to claim 13, wherein the strut is made of metal.

19. The strut according to claim 13, wherein the strut is a flat strip.

* * * * *